(No Model.) 3 Sheets—Sheet 1.
C. SEYBOLD.
PASTING, GUMMING, AND GLUING MACHINE.
No. 367,452. Patented Aug. 2, 1887.
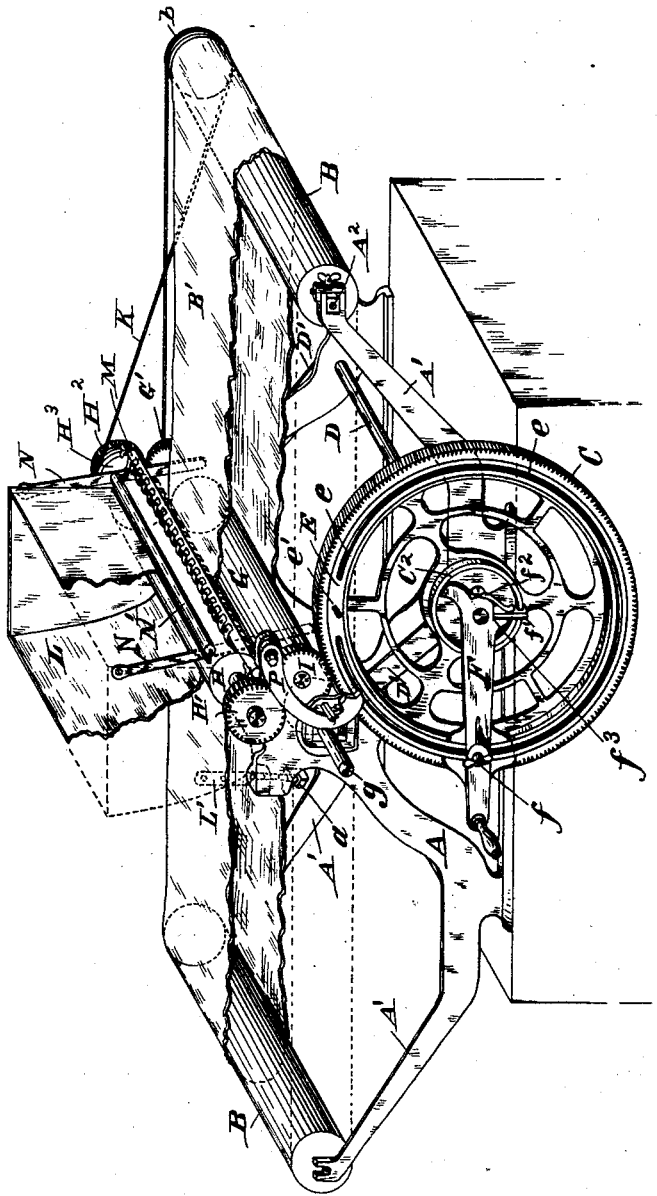
WITNESSES:
INVENTOR
Charles Seybold
per Wm. Hubbell Fisher,
ATTORNEY

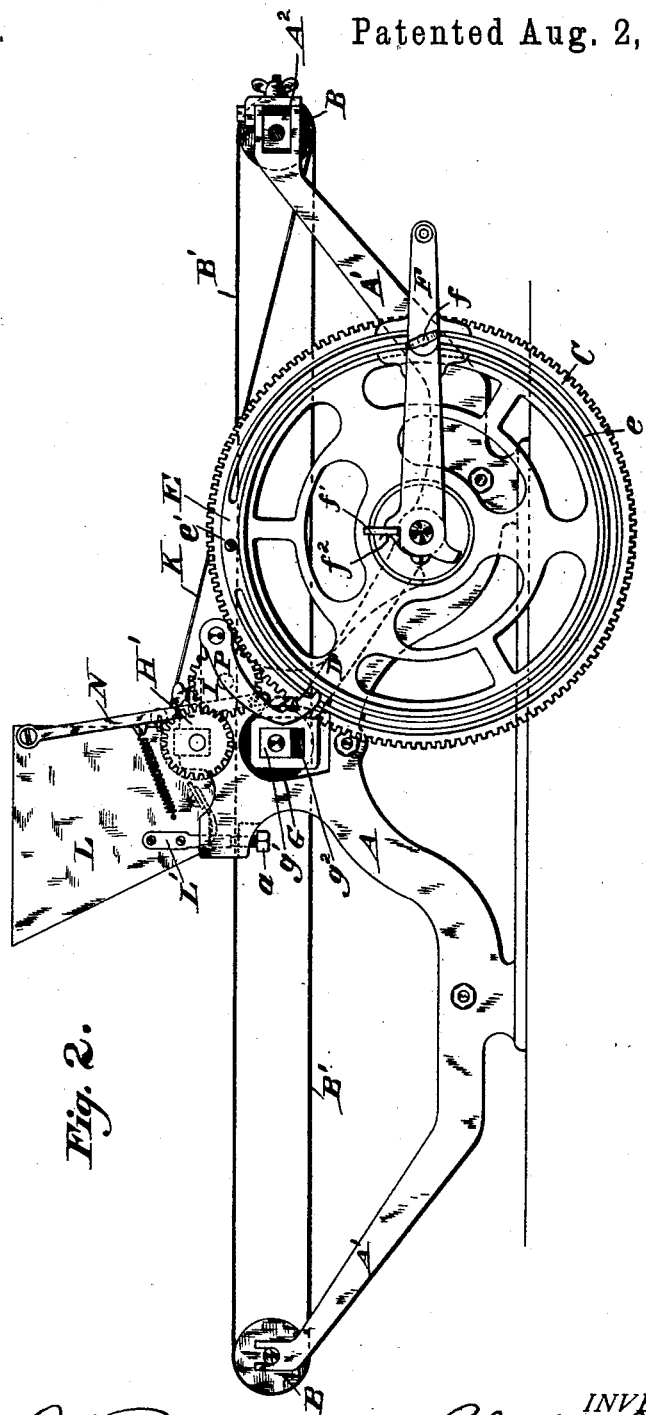

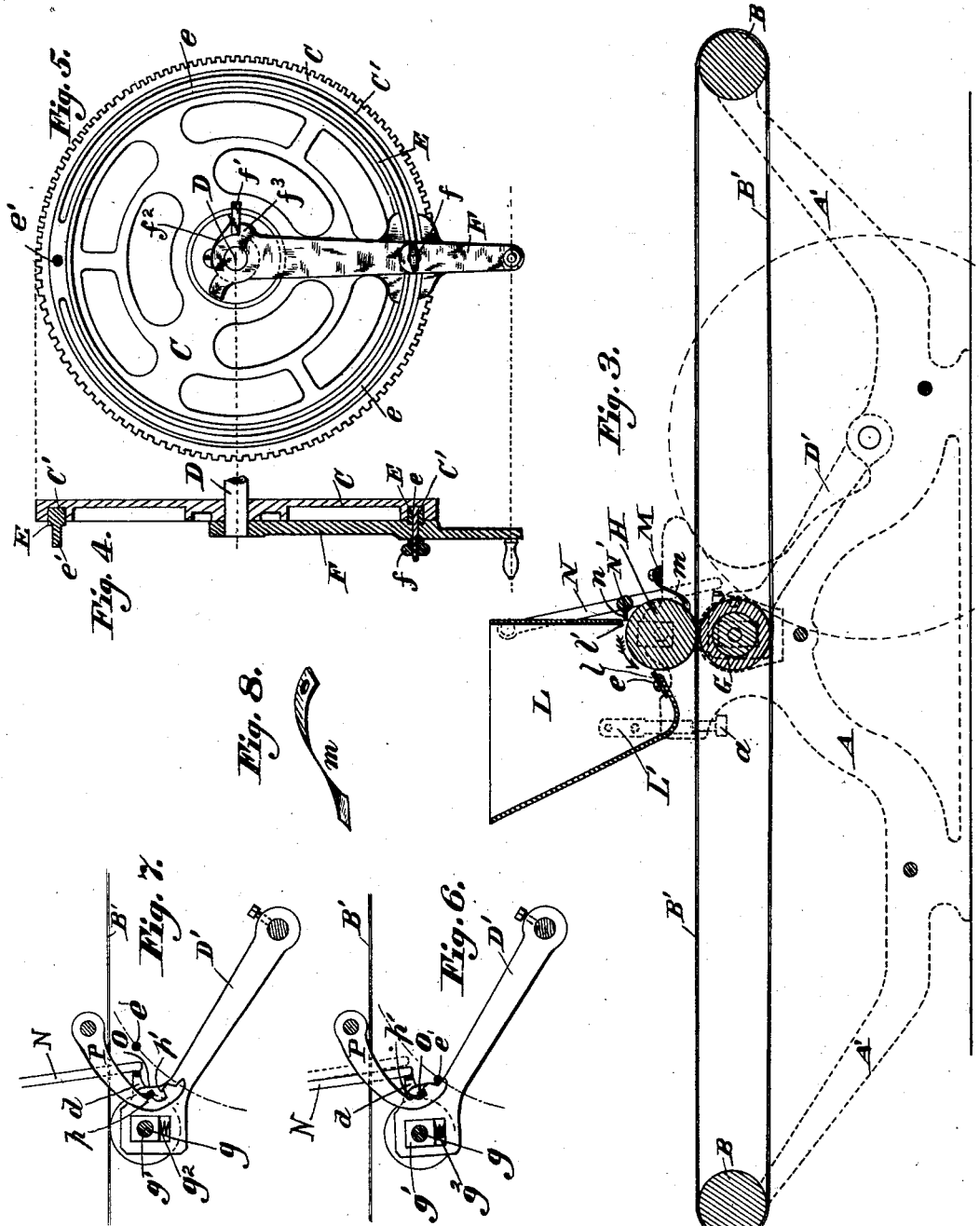

UNITED STATES PATENT OFFICE.

CHARLES SEYBOLD, OF CINCINNATI, OHIO.

PASTING, GUMMING, AND GLUING MACHINE.

SPECIFICATION forming part of Letters Patent No. 367,452, dated August 2, 1887.

Application filed June 3, 1885. Serial No. 167,541. (No model.)

*To all whom it may concern:*

Be it known that I, CHARLES SEYBOLD, a resident of Cincinnati, Hamilton county, Ohio, have invented certain new and useful Improvements in Pasting, Gumming, and Gluing Machines, of which the following is a specification.

The various features of my invention and their uses and advantages, conjointly or otherwise, will be apparent from the following specification.

In the accompanying drawings, Figure 1, Sheet 1, is a perspective view of my machine, part of the paste-hopper being broken away. Fig. 2, Sheet 2, is a side elevation of the machine. Fig. 3, Sheet 3, is a central longitudinal section of the machine. Fig. 4, Sheet 3, is a central cross-section of the crank, main gear-wheel, and the circular guide or gage. Fig. 5, Sheet 3, is a front view of the same. Fig. 6, Sheet 3, shows the position of various parts of the machine when the compression-roller is down. Fig. 7, Sheet 3, shows the positions of the same parts when the compression-roller is raised. Fig. 8, Sheet 3, shows one of the directing-teeth in perspective.

A designates the frame-work, which is made of suitable shape to conveniently support the working parts of the machine in their proper positions. The arms A' of the frame-work support the rollers B, over which the endless cloth B' passes. One of the rollers B is preferably provided with sliding journal-boxes $A^2$, by means of which the roller can be set out and the cloth tightened. The gear-wheel C is centered on the shaft D and turns loosely upon it. Near the periphery is a groove, C', cut in the flat face of the wheel and making a complete circle. A circular gage, E, fits in the groove C', and is arranged to move in it easily. The guide-piece E is provided with a groove, $e$, which makes almost a complete circle. From the face of the guide-piece, between the ends of the groove $e$, is placed the pin $e'$. The crank F is centered on the shaft D and turns loosely thereon. It is provided with a clamp-screw, $f$, which fits into the groove $e$ and serves to fasten the crank F and guide-piece E together. This inner end of the crank F is provided with a clutch, so arranged as to catch and turn the gear C with the crank in one direction, but to allow the crank to be moved in the other direction without imparting motion to the gear-wheel. The particular clutch which I prefer is shown in Fig. 1. A circular rim, $C^2$, projects from the face of the wheel C. The clutch $f'$ is hinged to the crank F, and is held against the shoulder $f^3$ by the spring $f^2$. The clutch $f'$ fits over the rim $C^2$, and when the crank F is turned to the left from above downward it moves the gear C; but when the crank is turned in the opposite direction the gear C remains stationary.

Two arms, D', are rigidly attached to the shaft D. The free extremity of each is enlarged and provided with an opening, in which the journal-boxes $g'$ are placed. The journal-box $g'$ is smaller than the opening in which it rests, and the rest of the space is made up or filled by a spring, $g^2$. The two springs $g^2$ form an elastic bed for the compression-roller G. The shaft $g$ of the compression-roller G is journaled in the boxes $g'$. The compression-roller G is preferably made of some elastic material. The paste-roller H is journaled in the frame A, preferably immediately over the roller G. The endless cloth B' passes between these two rollers.

An idler, I, is mounted preferably on the face of the frame A, and meshing with both the gear C and the pinion H', transmits motion to the latter. This pinion H' is rigidly attached to the shaft of the roller H. On the opposite end of the roller H is another pinion, $H^2$, which meshes with the pinion G' in certain positions of the latter. The pinion G' is on the shaft $g$ and turns the compression-roller; also on the shaft of the roller H is a pulley, $H^3$. On the end of the roller B another pulley, $b$, is placed. Over the pulleys $H^3$ and $b$ a twisted belt or band, K, is passed and transmits motion from the former to the latter. The paste-hopper L rests on the top of the machine over the paste-roller H. To each end of the paste hopper a strip, L', is attached. These strips project downwardly below the hopper and fit in holes in the top of the frame, and each preferably rests on its set-screw $a$, screwed into the bottom of the hole into which it is inserted. Set-screws $a$ regulate the depth of these holes and determine in this way the setting of the hopper. The lowest part of the hopper is below the opening in which the paste-roller operates. That edge of the opening against which the paste-roller turns is provided with a scraper, $l$, which extends entirely across the hopper and may be regulated by set-screws at any desired distance from the roller, determining in this way the thickness of the paste on the surface of the roller. The peculiar position of the paste-hopper L, being set so as to cover about one-third of the paste-roller H, and its shape, secures constant motion in the paste when the machine is in operation, thus no lumps can close up the opening $l'$, and the paste is always kept fresh.

In front of the paste-roller a strip, M, extends across the machine. A series of teeth, $m$, are attached to the strip M and extend downwardly against the face of the roller H. One of these teeth $m$ is shown in perspective in Fig. 8. They are preferably made of very thin elastic metal, and are curved on themselves, so as to present an edge to the surface of the roller. The extremity which points downward is a sharp point. An opening, $l'$, is necessarily left between the edge of the vertical face of the hopper and the surface of the paste-roller. The preferable means of closing this opening is that shown in the drawings. Two arms, N, are swung from the hopper, one from either end, and they carry between them a wedge-shaped valve to close this opening. The preferable construction of this valve is as follows: A round strip, N', stretches across the front of the hopper opposite the opening $l'$ and is secured to the arms N. A flexible lip, $n$, projects from the face of the strip N' and fits into the opening $l'$. A device must now be provided to retract this valve when the paste-roller is in motion, as the movement of the paste-roller is in the direction shown by the arrow, and it would draw in the wedge-shaped valve and damage the machine. This mechanism will be described farther on.

A pawl, P, is pivoted to the face of the frame A, and is provided with two notches, $p$ and $p'$. The arm D' has a projection, $d$, extending from its enlarged extremity and touching the free end of the arm N. A pin, O, projects from the face of the arm D' and fits in one or the other of the notches $p$ $p'$.

The machine is operated by the crank F, preferably operated by hand, as shown. As the crank is raised it strikes against the projecting end of the shaft $g$. This raises the shaft $g$, and with it the compression-roller G. Since both arms D' are rigidly secured to the shaft D, both ends of the roller G are raised equally by the impingement of the crank F against the shaft $g$. Swinging from the shaft D, the arms D' move in the arc of a circle; but as the motion is so slight it is practically a vertical movement for the roller G. When the roller G is raised, it is held up by the pin O catching in the upper notch, $p$, of pawl P. When the roller G is raised, the gear-wheels G' and H² mesh together. With this upward motion of the crank F the gear-wheel C does not turn; but with the downward movement the friction-clutch comes into play and the gear-wheel C turns. The action of the gear-wheel C is easily traced, the paste-roller turns in the direction of the arrow, the roller G turns in the opposite direction, and the cloth B' moves between them at the same rate at which they are turning. When the crank F reaches the end of its downward stroke, the pin $e'$ strikes against the pawl P, dislodges it, and allows the roller G to drop, and all motion in the machine stops. The wedge-valve N' is also operated by the upward and downward movement of the roller G. This action is illustrated in Figs. 6 and 7. In Fig. 7 the roller is shown raised and the piece $d$ holds the arms N out. The motion of the machine only occurs when the roller G is raised, so that during this time the valve is held out of the opening $l'$, and the turning of the roller H itself will prevent a leakage of paste. When the roller G drops, as shown in Fig. 6, the piece $d$ also comes down slightly and allows the arm N to fall closer to the hopper.

The machine is intended to paste, gum, or glue labels and similar work requiring the whole surface covered. A piece of pasteboard is taken the size of the work to be pasted and on it are placed a number of sheets, say twenty-five or thirty. The stroke of the machine is then adapted to the work by clamping the crank F at the proper point in the circular guide-piece E. It is very convenient for short work to have the stroke short, so that there may be no lost motion. When the stroke is made too long, it does not interfere with the working of the machine, but puts unnecessary work on the operator.

The pasteboard, with the sheets to be pasted, is now put under the paste-roller from the left of the machine, so that its right-hand end may be just in position to be fully pasted. The crank F is now raised and the compression-roller thrown up. Now, on the downward or reverse movement of the crank the gearing is put into motion and the package of sheets and pasteboard is carried under the paste-roller and the top sheet pasted. As soon as the end of the stroke is reached the pin $e'$ dislodges the pawl P and permits the compression-roller to drop. The operator now takes off the top sheet from the package, which is now to the right of the rollers, and then pushes the package back under the paste-roller, and the operation above described is repeated.

The paste-roller is always covered with paste its entire length, but the piece of pasteboard used permits even the narrowest work to be pasted without soiling the cloth. At the same time the very last sheet in the package may be pasted.

While the various features of my invention are preferably employed together, one or more of said features may be used without the remainder, and, in so far as applicable, one or more of said features may be used in connection with pasting-machines other than the machine herein specifically described.

What I claim as new and of my invention, and desire to secure by Letters Patent, is—

1. In a pasting-machine, the combination of wheel C, guide E, pin $e'$, crank F, roller G, having projecting shaft $g$, arms D', pin O, and pawl P, provided with notches $p$ $p'$, substantially as and for the purposes set forth.

2. The combination of hopper L, overlapping roller H, and swinging valve N', and mechanism, substantially as described, for automatically releasing the latter, substantially as set forth.

3. The combination of gear-wheel C, guide E, having pin $e'$, crank F, arms D', pin O, idler I, rollers H and G, provided with gearing, and pawl P, as and for the purposes set forth.

4. In a pasting-machine, the combination of the hopper L, arms N, valve N', lip $n$, and roller H, substantially as set forth.

CHARLES SEYBOLD.

Attest:
OTTO ELWERT,
JNO. W. STREHLI.